US009153052B2

(12) United States Patent
Ameline et al.

(10) Patent No.: US 9,153,052 B2
(45) Date of Patent: Oct. 6, 2015

(54) GRAPHICS PROCESSING METHOD AND SYSTEM

(75) Inventors: Ian R. Ameline, Toronto (CA); Eric A. Blais, Montreal (CA)

(73) Assignee: AUTODESK, INC., San Rafael, CA (US)

(*) Notice: Subject to any disclaimer, the term of this patent is extended or adjusted under 35 U.S.C. 154(b) by 0 days.

(21) Appl. No.: 12/004,042

(22) Filed: Dec. 20, 2007

(65) Prior Publication Data

US 2008/0100640 A1     May 1, 2008

Related U.S. Application Data

(62) Division of application No. 10/969,878, filed on Oct. 22, 2004, now Pat. No. 8,744,184.

(51) Int. Cl.
*G06T 11/40*     (2006.01)
(52) U.S. Cl.
CPC ............. *G06T 11/40* (2013.01); *G06T 2200/12* (2013.01)
(58) Field of Classification Search
CPC ... G06T 11/40; G06T 15/503; G06T 2200/12; G06T 5/002; G06T 7/0079–7/0083
USPC ............................ 345/611–616; 382/173–180
See application file for complete search history.

(56) References Cited

U.S. PATENT DOCUMENTS

| | | | |
|---|---|---|---|
| 4,947,158 A * | 8/1990 | Kanno | 345/441 |
| 5,122,873 A | 6/1992 | Golin | |
| 5,438,656 A | 8/1995 | Valdés et al. | |
| 5,495,429 A | 2/1996 | Craven et al. | |
| 5,872,902 A | 2/1999 | Kuchkuda et al. | |
| 6,134,345 A | 10/2000 | Berman et al. | |
| 6,134,346 A | 10/2000 | Berman et al. | |
| 6,167,166 A | 12/2000 | Loce et al. | |
| 6,228,703 B1 | 5/2001 | Chang | |
| 6,288,703 B1 | 9/2001 | Berman et al. | |
| 6,738,154 B1 * | 5/2004 | Venable | 358/1.15 |
| 6,982,723 B1 | 1/2006 | Szymaniak | |
| 7,054,503 B2 | 5/2006 | Ishikawa | |
| 7,302,094 B2 | 11/2007 | Ameline et al. | |
| 2003/0147100 A1 * | 8/2003 | Andersen | 358/464 |

(Continued)

OTHER PUBLICATIONS

Document NN9606247. "System and Method for Interactively Identifying Regions of a Digital Image". IBM Technical Disclosure Bulletin, Jun. 1, 1996. vol. 39, Issue 6, pp. 247-248.

(Continued)

*Primary Examiner* — Aaron M Richer
(74) *Attorney, Agent, or Firm* — Artegis Law Group, LLP

(57) ABSTRACT

The embodiments discussed herein involve flood filling a region with anti-aliasing. In forming a fill region, a candidate pixel can be included in the region based on a color of the pixel and also a color of a neighbor of the point. The inclusion basis may be a color distance between a seed color and the points, and a color distance between the seed color and the point's neighbor. Points in the region may be weighted according to their color distance relative to the seed color, where the color distance can also take into account alpha values. Flood filling may be anti-aliased by assigning alpha values to pixels in gaps between corners of the fill region, where an alpha value may be proportional to a point's contribution to the gap. Dimples in a fill region may be tested for and used to determine which of two flood fill algorithms to use.

15 Claims, 18 Drawing Sheets

(56) References Cited

U.S. PATENT DOCUMENTS

| | | | |
|---|---|---|---|
| 2003/0174872 A1 | 9/2003 | Chalana et al. | |
| 2004/0042682 A1* | 3/2004 | Jia et al. | 382/275 |
| 2004/0130546 A1* | 7/2004 | Porikli | 345/423 |
| 2004/0145599 A1* | 7/2004 | Taoka et al. | 345/698 |
| 2005/0007381 A1 | 1/2005 | Chen | |
| 2005/0168476 A1* | 8/2005 | Levene et al. | 345/582 |
| 2005/0206657 A1* | 9/2005 | Arcas | 345/660 |
| 2005/0226502 A1 | 10/2005 | Cohen et al. | |

OTHER PUBLICATIONS

Porter et al, "Compositing Digital Images", Computer Graphics, v. 18, No. 3, Jul. 1984, pp. 253-259.

Fathi, M. And J. Hiltner, "A New Fuzzy Based Floor-Fill Algorithm for 3 D NMR Brain Segmentation", IEEE SMC '99 Conference Proceedings, 1999 IEEE International Conference on Systems, Man, and Cybernetics, vol. 4, 1999, p. 881-885.

Marcos Martin et al., "A topology-based filing algorithm", Computer and Graphics, vol. 25, No. 3, 2001, p. 493-509.

Office Action mailed Mar. 30, 2009 in U.S. Appl. No. 12/352,804.
Office Action mailed Jun. 15, 2009 in U.S. Appl. No. 12/352,806.
Office Action mailed Mar. 31, 2009 in U.S. Appl. No. 12/352,797.
Office Action mailed Apr. 12, 2007 in U.S. Appl. No. 10/969,878.
Office Action mailed Jan. 3, 2007 in U.S. Appl. No. 10/969,878.
Office Action mailed Sep. 4, 2007 in U.S. Appl. No. 10/969,878.
Office Action mailed Jan. 9, 2008 in U.S. Appl. No. 10/969,878.
Office Action mailed Aug. 12, 2008 in U.S. Appl. No. 10/969,878.
Office Action mailed Mar. 25, 2009 in U.S. Appl. No. 10/969,878.
Office Action dated Aug. 21, 2012 for copending U.S. Appl. No. 12/352,801.
Office Action mailed Apr. 26, 2010 for co-pending U.S. Appl. No. 12/352,801.
Office Action mailed Jun. 7, 2010 for co-pending U.S. Appl. No. 12/352,797.
Final Office Action mailed Sep. 29, 2009 in U.S. Appl. No. 10/969,878.
Final Office Action mailed Oct. 23, 2009 in U.S. Appl. No. 12/352,797.
Final Office Action mailed Oct. 23, 2009 in U.S. Appl. No. 12/352,804.
Office Aciton dated Feb. 28, 2011 issued in co-pending U.S. Appl. No. 12/352,801.
Final Office Action dated Nov. 4, 2010 issued in co-pending U.S. Appl. No. 12/352,801.
Office Action dated Aug. 18, 2011 for copending U.S. Appl. No. 12/352,801.
Notice of Allowance dated Jan. 24, 2014 for copending U.S. Appl. No. 12/352,801.
Notice of Allowance dated Jan. 27, 2014 for copending U.S. Appl. No. 10/969,878.
Office Action dated Apr. 19, 2013 for copending U.S. Appl. No. 12/352,801.
Office Action dated Sep. 11, 2013 for copending U.S. Appl. No. 10/969,878.
Notice of Allowance dated Mar. 12, 2014 for copending U.S. Appl. No. 12/352,801.

* cited by examiner

GRAPHICS PROCESSING METHOD AND SYSTEM

CROSS-REFERENCE TO RELATED APPLICATION

This application is a divisional of U.S. application Ser. No. 10/969,878 filed Oct. 22, 2004 now U.S. Pat. No. 8,744,184.

This application is related to U.S. application entitled "TRANSPARENCY AND/OR COLOR PROCESSING", Ser. No. 10/927,510, by Ian Ameline and Michael Daum, filed Aug. 27, 2004 and incorporated by reference herein.

BACKGROUND OF THE INVENTION

1. Field of the Invention

The present invention is directed to a system and method for flood filling. Aspects of the present invention relate to anti-aliased flood filling without artifacts.

2. Description of the Related Art

FIG. 1 shows an original or initial image 50 with regions 52 defined by strokes or lines 54. FIG. 2 shows image 50 where a flood fill operation on the regions 52 in FIG. 1 has produced corresponding filled regions 72.

Flood filling is an important technique in two-dimensional computer graphics and has many uses such as coloring the cells of 2D cartoon characters, changing the color of a region in a photographic image, etc. A flood fill may also be applied to a three-dimensional surface, but the calculation is usually two-dimensional. Most imaging programs such as *Adobe Photoshop, Painter*, and GIMP, have a user tool for performing a flood fill operation. Typically, these tools allow a user to click a point on an image (a seed point) causing a surrounding patch or region of like-colored pixels to be filled with the user's choice of color. In image 50 in FIG. 1, the regions 52 were originally light colored patches bounded by dark colored pixels of the lines 54 (as discussed later, the dashed rectangular region 76 is shown blown-up in FIG. 3). After being flood filled, the same regions 52 (seen as regions 72 in FIGS. 2/3) exhibit the new fill color up to the pixels of the lines 54 that delimit the regions 52/72.

Flood filling a patch or region of an image with a fill color, fill image, fill function, fill pattern, etc., has usually entailed identifying contiguous pixels that have a same or similar color, and filling that region by setting its pixels to the fill color. Typically, the mutually contiguous pixels in the fill region have an initial color close to or the same as a given base color, usually referred to as a seed color. A color that is "close" may vary from the seed color by less than a specified tolerance. For identifying a fill region, there are many algorithms, most of which simply mark candidate pixels as being "in" or "out" of the region without performing any anti-aliasing.

A well-known flood filling technique is Alvy Ray Smith's tint fill algorithm (ACM Siggraph Proceedings, August 1979). Many flood-filling techniques are similar to Alvy Ray Smith's technique, which usually starts with an array of pixels (an image), a seed color (usually the color of the start pixel), and a destination fill color (the new color being filled in). Starting at the start pixel and working outward, neighboring pixels are recursively considered and added to the region if their color matches or approximates the seed color. The pixels added to the region are set to the fill color.

As seen above, a flood-filled region abuts differently colored pixels. Anti-aliasing has been used to smooth the meeting of these differing colors, for example by applying a blur to the fill region (or to a mask of the fill region). To understand anti-aliasing, it can help to think of an image as a discrete sampling, or "discretization", of actual or hypothetical continuous colors. Generally, anti-aliasing smoothes the discretization of an image by padding pixels with intermediate colors. In the context of a flood fill operation, anti-aliasing has been computed by performing a flood fill type operation to create a "mask" image of the fill region, applying a slight blur to that mask, and then blending a color into the target image via the mask image. However, the anti-aliasing of this approach is at best a gross approximation of the theoretical correct solution, and as such several visual artifacts can be found in the results. Examples of such artifacts include haloing (see the light pixels between line 52 and region 72 in FIG. 3), failure to get into corners of the fill region, and others.

FIG. 3 shows problems that can occur with prior art anti-aliased flood filling. FIG. 3 is a blow-up of dashed rectangular region 76 in FIG. 2. As can be seen, pixels such as pixel 90 carry shades of the original background color 92 into the filled regions 72, creating a haloing effect. A flood fill is often blurred to emulate anti-aliasing, but insufficient blurring creates jagged edges, and too much blurring creates soft edges and haloes as in FIG. 3. There is no median approach that gives good anti-aliasing without a haloing. Previously, artifacts from anti-aliased flood filling have not been automatically correctable or avoidable.

There is a need to perform anti-aliased flood fill operations without producing visual artifacts.

SUMMARY OF THE INVENTION

It is an aspect of an embodiment described herein to provide a system and method for performing an anti-aliased flood fill technique that avoids haloing and other artifacts.

It is an aspect of an embodiment described herein to provide a system and method of hybrid anti-aliased flood filling where either of two flood fill algorithms may be automatically used It is an aspect of an embodiment described herein to provide a system and method for testing to automatically determine which of two flood fill algorithms to use for a flood fill operation.

It is an aspect of an embodiment described herein to provide an improved tint fill algorithm that works well with images of line drawings.

It is an aspect of an embodiment described herein to provide an improved flood fill algorithm that works well with all images.

It is an aspect of an embodiment described herein to provide a system and method for calculating color distance that improves anti-aliasing when used in a tint fill algorithm.

It is an aspect of an embodiment described herein to provide a system and method for performing a flood fill where a stopping criteria or inclusion test for determining pixels to fill looks at two or more pixels to determine whether to include a pixel.

It is an aspect of an embodiment described herein to provide a system and method for flood filling where a fill mask contains levels of inclusion rather than flags for binary inclusion/exclusion.

It is an aspect of an embodiment described herein to provide a system and method of anti-aliasing a flood fill operation by performing an anti-aliasing pass on a fill mask before applying a blur.

It is an aspect of an embodiment described herein to provide a system and method of anti-aliasing by setting opacity of pixels proportional to their respective proportions inside or outside a hypothetical line drawn between corners surrounding the pixels.

It is an aspect of an embodiment described herein to provide a system and method of anti-aliasing in a flood fill operation by using a stopping criteria based on a color distance between a seed color and a point, and based on a color distance between the point's neighbor and the seed color.

The above aspects can be attained by a system that flood fills a region with anti-aliasing. In forming a fill region, a candidate pixel can be included in the region based on a color of the pixel and also a color of a neighbor of the pixel. The inclusion basis may be a color distance between a seed color and the points, and a color distance between the seed color and the point's neighbor. Points in the region may be weighted according to their color distance relative to the seed color, where the color distance can also take into account alpha values. Flood filling may be anti-aliased by assigning alpha values to pixels in gaps between corners of the fill region, where an alpha value may be proportional to a point's contribution to the gap. Dimples in a fill region may be tested for and used to determine which of two flood fill algorithms to use.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DEFINITIONS

Following are definitions for terms used herein.

A "color", or "color value" is an n-dimensional value indicating the perceived color of a point or pixel. Colors can be defined in RGBA format, which is a 4-dimensional value where the dimensions refer to the intensity of red, green, blue, and opacity (alpha) of the color respectively. As used herein, "color" or "color value" can be in any color space RGB, HSV, CMYK, etc.

A "color distance" is a value, preferably normalized, indicating various measures of the difference between two colors. A color distance between two colors can indicate if the two colors are identical (e.g. a color distance of 0.0). A color distance can also indicate if two colors are completely different (e.g. a color distance of 1.0). Color distance is preferably represented as a floating point value between 0.0 and 1.0 but can also be represented as fixed point values of any precision—i.e. 8 bit fixed point 0 to 255, or 16 bit fixed point—0 to 65535. An 8 bit fixed point may be adequate in typical image processing applications.

A "fill mask" is a two-dimensional array or set of single channel values (e.g. 8 bit points representing 0.0 to 1.0) and usually of the same size or color channel depth as the input image being processed. Points in the fill mask contain normalized values indicating the amount that the corresponding image point will be modified by the flood fill operation.

A "fill set" is a set of points for the image that will be modified by a flood fill operation, usually corresponding to the non-zero pixels in a fill mask.

A "seed point" is a point in a specific image, usually given by the user to use as the starting point for a flood fill operation. A seed point can also be algorithmically determined, for example by looking for a point with a color close to the average color of a neighborhood of points. The seed point is usually sure to be included in the fill set and is also the point with which other points in the fill set will be directly or indirectly contiguous with.

A "seed color" is a color of a seed point in an image to be processed. Although it is possible to start a flood fill operation with a point that is not identical to the seed color (e.g. it may be within a range), usually the seed color will be the initial color of the seed point.

A "tolerance" is a value, usually normalized, that can be used when generating a fill set to indicate the largest distance between a color and the seed color that will be considered equivalent to a color distance indicating equivalence (e.g. a color distance of 0.0).

Other definitions may or may not appear elsewhere herein.

DETAILED DESCRIPTION OF THE PREFERRED EMBODIMENTS

Overview

Hybrid Approach

Figure 1:
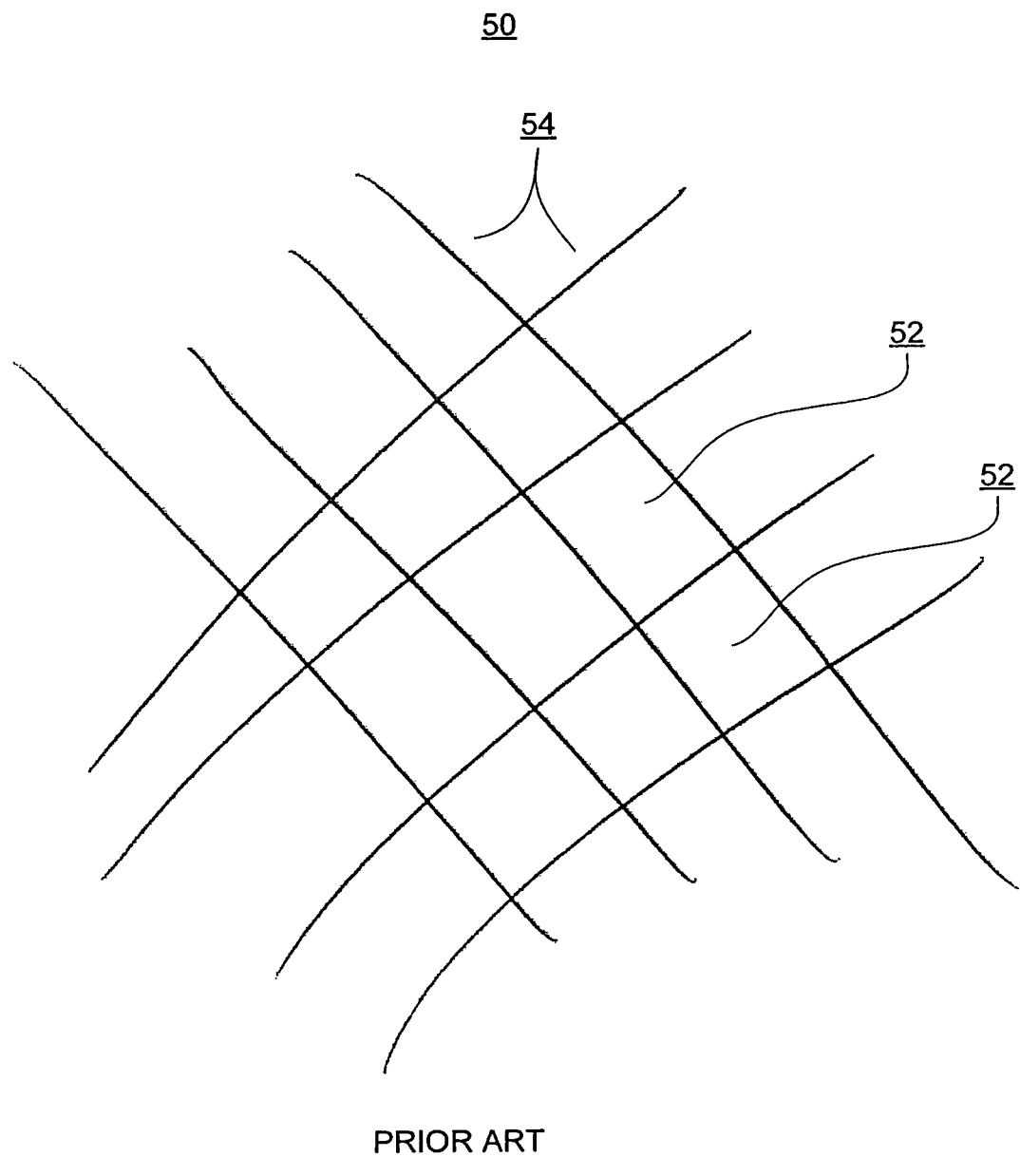
FIG. 1 shows an original or initial image with regions defined by strokes or lines.
Figure 2:
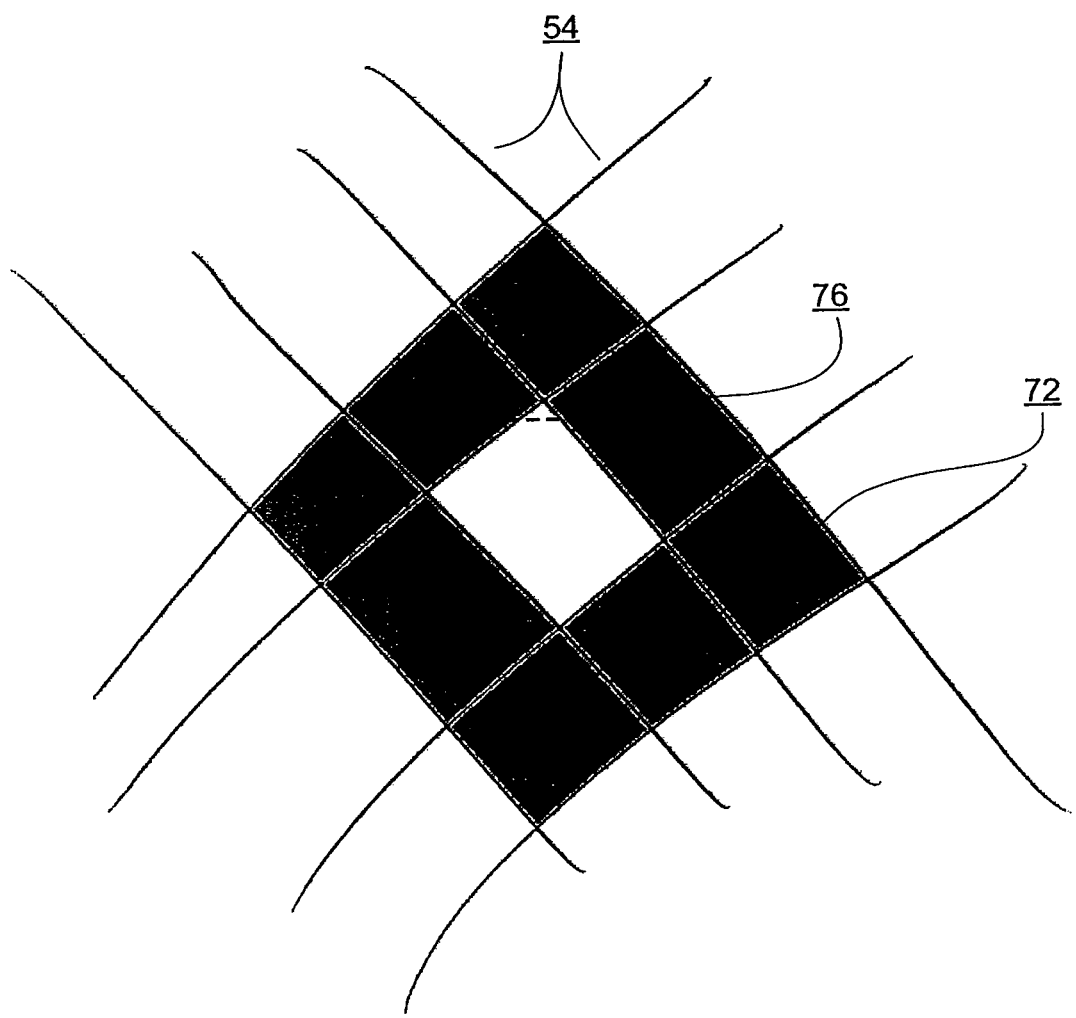
FIG. 2 shows an image where a flood fill operation on the regions in FIG. 1 has produced corresponding filled regions.
Figure 3:
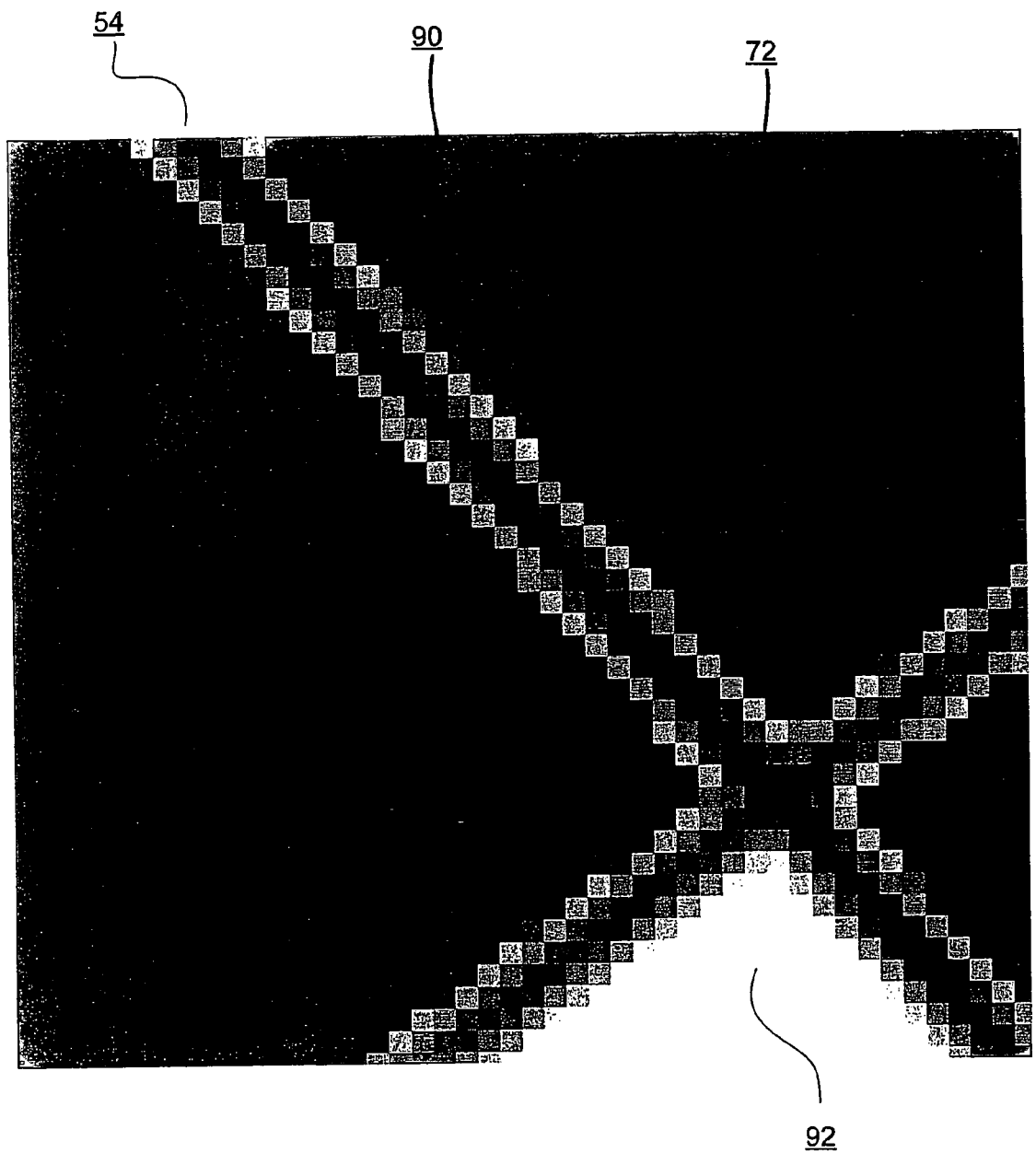
FIG. 3 shows problems that can occur with prior art anti-aliased flood filling.
Figure 4:
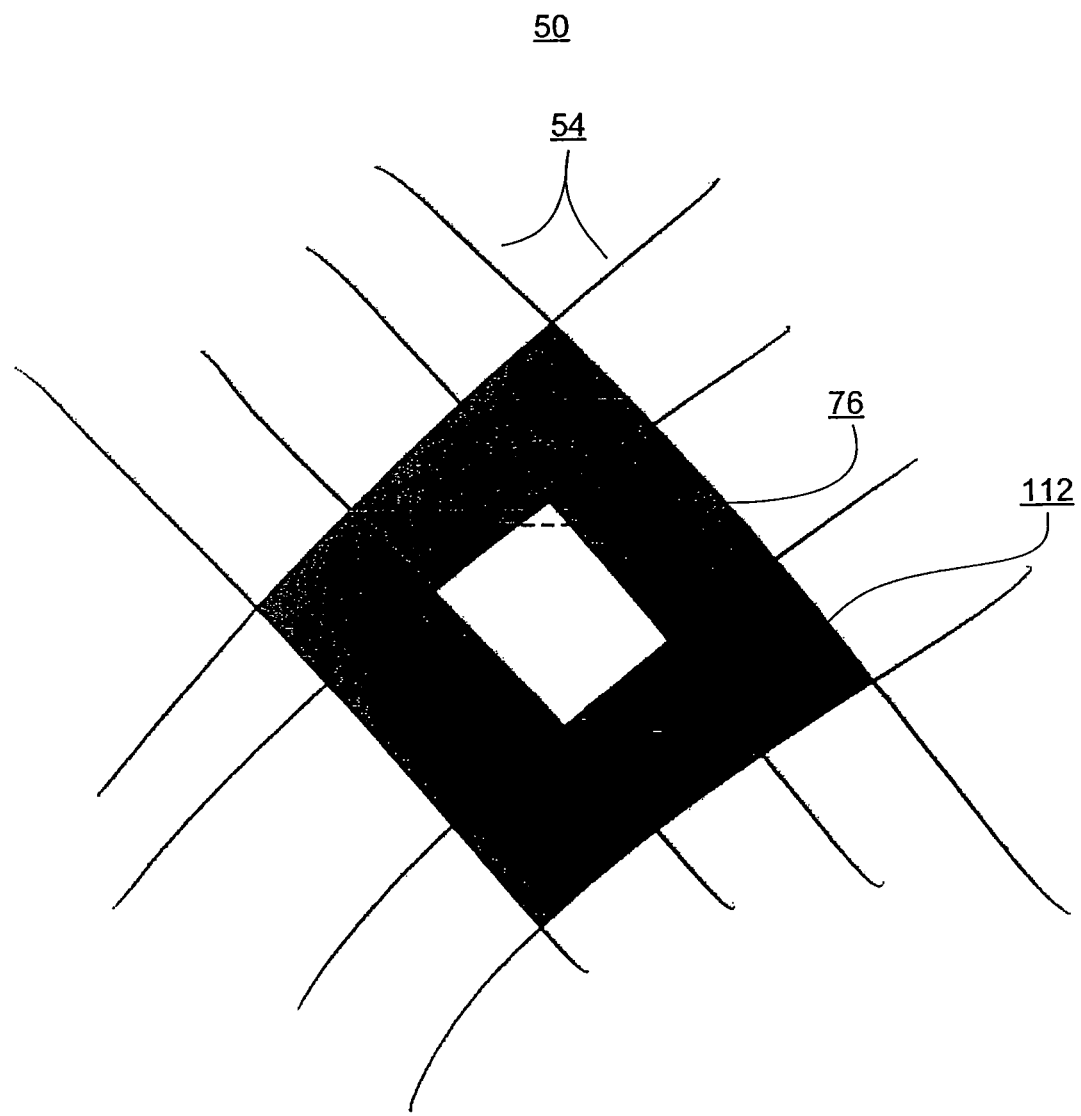
FIG. 4 shows filled regions resulting from applying new flood fill techniques to the original image in FIG. 1.
Figure 5:
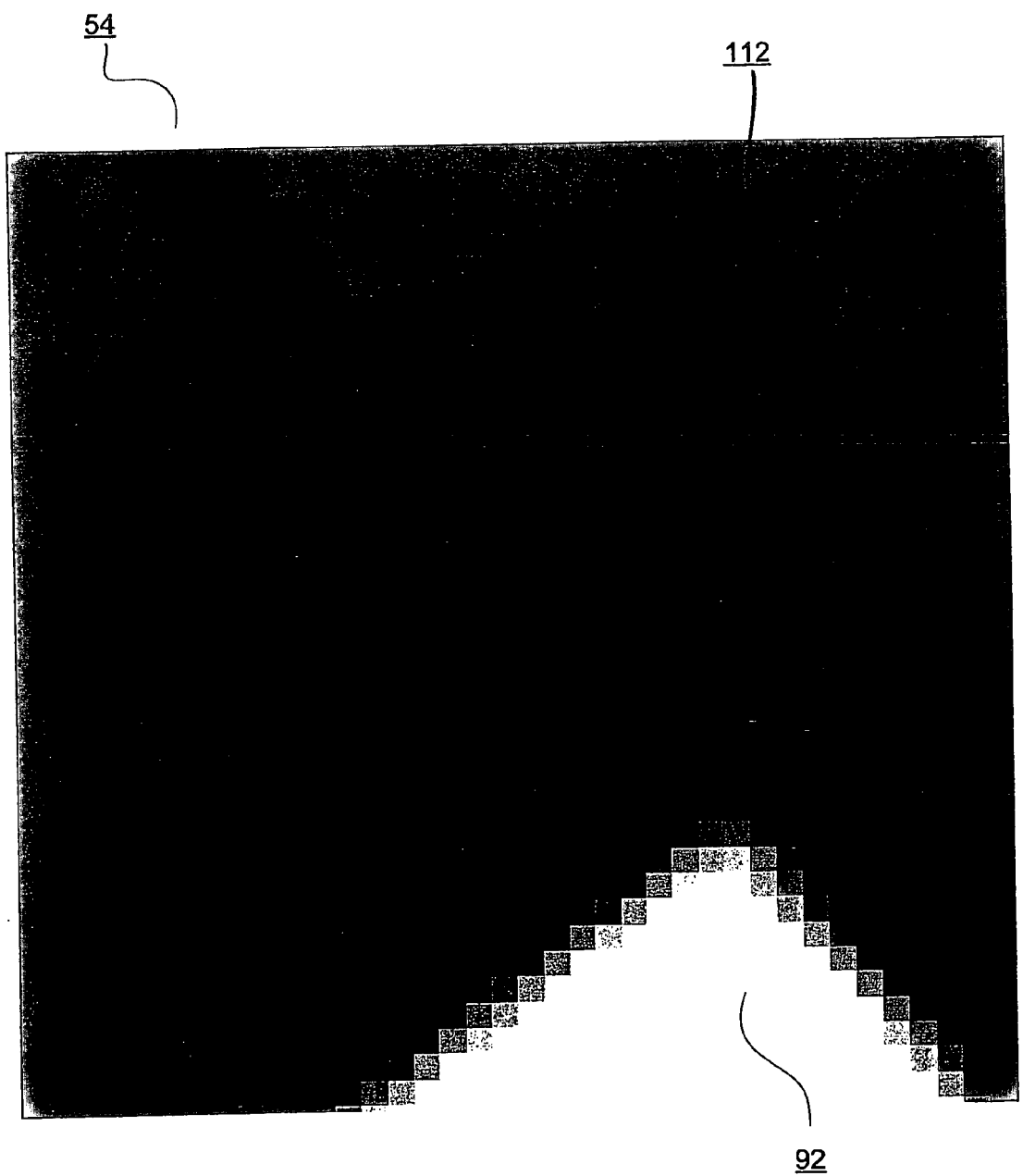
FIG. 5 shows a blow-up of the dashed rectangular area that is shown in both FIG. 4.

As discussed above, FIGS. 2 and 3 show results from a prior art flood fill operation applied to the original image 50. In contrast, FIG. 4 shows filled regions 112 resulting from applying new flood fill techniques to the same original image 50 in FIG. 1. The filled regions 112 correspond to regions 52 and can be compared to the corresponding prior art filled regions 72 in FIGS. 2 and 3. FIG. 5 shows a blow-up of the dashed rectangular area 76 that is shown in both FIGS. 2 and 4. By comparing the blown up prior art result shown in FIG. 3 with the blown up result in FIG. 5, it can be seen that haloing and other artifacts can now be automatically avoided or eliminated.

Figure 6:
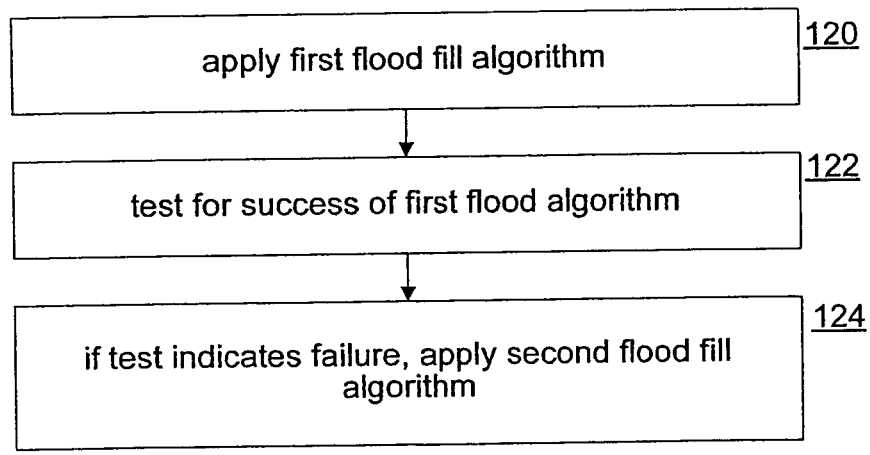
FIG. 6 shows an overview of a combined approach for performing a flood fill operation.

FIG. 6 shows an overview of a combined or hybrid approach for performing a flood fill operation. Although the three features in FIG. 6 provide a combined or hybrid approach to performing a flood fill operation, each of the components are individually new and useful, as discussed below. The hybrid approach involves first applying 120 a first flood fill algorithm, then testing 122 whether the first flood fill algorithm fails or produces an acceptable flood fill result, and applying 124 a second flood fill technique if the testing 122 indicates that the first flood fill algorithm fails or produces inferior results. As discussed below, the new first flood fill algorithm described herein works well on certain types of images, but can fail on others. However, failure of the first technique can be tested for. If failure is detected, the new second flood fill technique is used instead. The second algorithm works well on all images, but generally not as well on images preferred by the first algorithm (e.g. pencil sketches, etc.)

Figure 7:
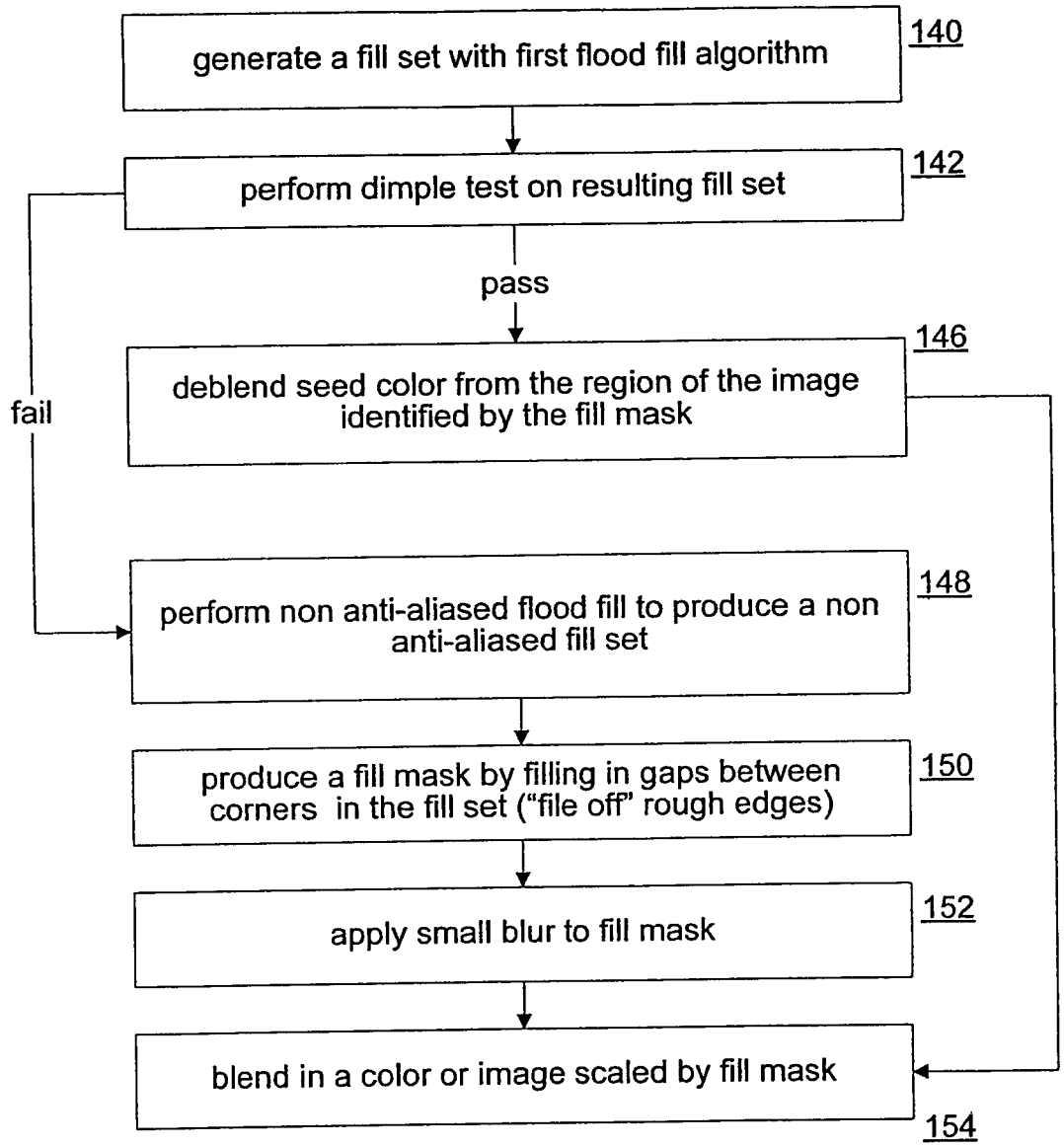
FIG. 7 shows detail of a hybrid approach for performing a flood fill operation.

FIG. 7 shows detail of a hybrid or two-algorithm approach for performing a flood fill operation. The process starts by generating 140 a fill set with a first flood fill algorithm. The success or effectiveness of the first flood fill algorithm is tested 142 to check for dimples in the fill set generated by step 140. If the first flood fill algorithm passes the dimple test 142, then the seed color is the deblended 146 from the region of the image identified by the fill mask. The deblending 146 may be performed according to various techniques described in the related patent application referenced above. If the dimple test 142 fails, then the results of the first algorithm may be discarded, and a non anti-aliased flood fill is performed 148 to produce a non anti-aliased fill set. This can be done by many types of flood fill algorithms. The fill set from step 148 is used to produce a fill mask by filling in 150 gaps between corners in the fill set. The fill mask produced by step 150 is slightly blurred 152. Finally, a target color (or image, function, etc.) is blended into the fill region of the image according to be values of the fill mask produced by either step 146 or step 152.

The first flood fill algorithm mentioned above has similarities with Alvy Ray Smith's tint fill algorithm but with new aspects relating to color distance measurement, stopping criteria, and anti-aliasing. This first algorithm works well on pencil sketches, line drawings, cartoon figures, etc., but can fail on airbrushed images and photographs. That is to say, the algorithm works well when there are abrupt or steep color differences. The test to determine whether the first algorithm failed can be characterized as looking for dimples. More specifically, the test involves looking for pixels in the fill mask or region (or an approximation thereof) that are different from both neighboring pixels in the vertical or horizontal direction. The second flood fill algorithm has similarities to standard approaches used by various image processing and editing applications, but with new aspects related to how anti-aliasing is performed, namely generating a mask image and filling in areas around rough edges (in effect visually "filing off" the rough edges) and then slightly blurring the so-filed mask. The mask is then used to blend in a color (or other image) into the target image.

First Flood Fill Algorithm

To recursively find a fill region a stopping criteria is used. The stopping criteria tells the algorithm when to stop searching for pixels in the fill area around the starting pixel. A strict stopping criteria can be used to identify the region. With this approach, pixels are determined to be either in the region or not in the region. But this stopping criteria approach can cause the fill region to have jagged edges. Another approach is to test a degree to which a pixel is "in" the region based on its color distance, but this can cause the fill region to have soft blurry edges. Discussed below are a stopping criteria (a criteria to determine which pixels to include in the fill set/mask/region), a color distance measurement, and an anti-aliasing calculation are preferably all used in a first flood fill algorithm (preferably a tint fill type of algorithm). This first algorithm works well with certain types of images. By using the right stopping/inclusion criteria, anti-aliasing can be done at the current point; the pixel's contribution is known and the stop criteria creates the anti-alias effect.

Figure 8:
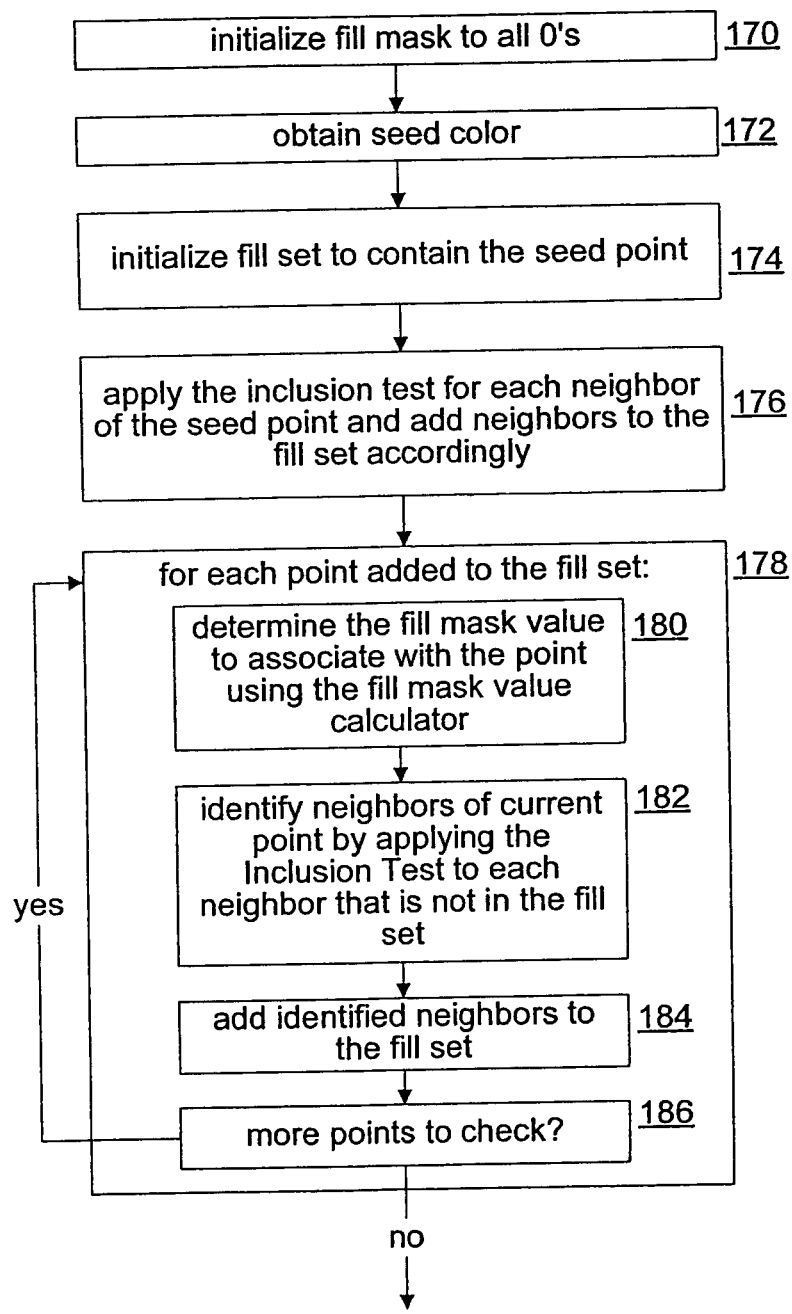
FIG. 8 shows a first flood fill algorithm.

FIG. 8 shows a first flood fill algorithm. The first flood fill algorithm starts with an input image to which the flood fill algorithm is applied, a seed point in the image, and a tolerance. The algorithm produces a fill mask that can be used to flood fill a color at the end of the overall flood fill operation, for example at step 154 in FIG. 7.

Referring to FIG. 8, a fill mask is initialized 170 by setting its elements to zero. A seed color is obtained 172, for example by using the color value of a seed point selected by a user. A fill set is initialized 174 to contain the seed point. An inclusion test is applied 176 to each neighbor of the seed point and neighbors are added to the fill set accordingly. The inclusion test or stopping criteria is discussed further below with reference to FIG. 9. For 178 each point added to the fill set, a corresponding fill mask value is determined 180 using a fill mask value calculation. The fill mask calculation is discussed further below with reference to FIG. 11. Neighbors of the current point are identified 182 by applying 176 the inclusion test to each neighbor that is not in the fill set. Identified neighbors are added 184 to the fill set. The process continues until 186 there are no points left to check. The result is a fill mask with elements that can vary over a range such as from 0 to 255 or 0.0 to 1.0; any range between any two numbers is sufficient.

Figure 9:
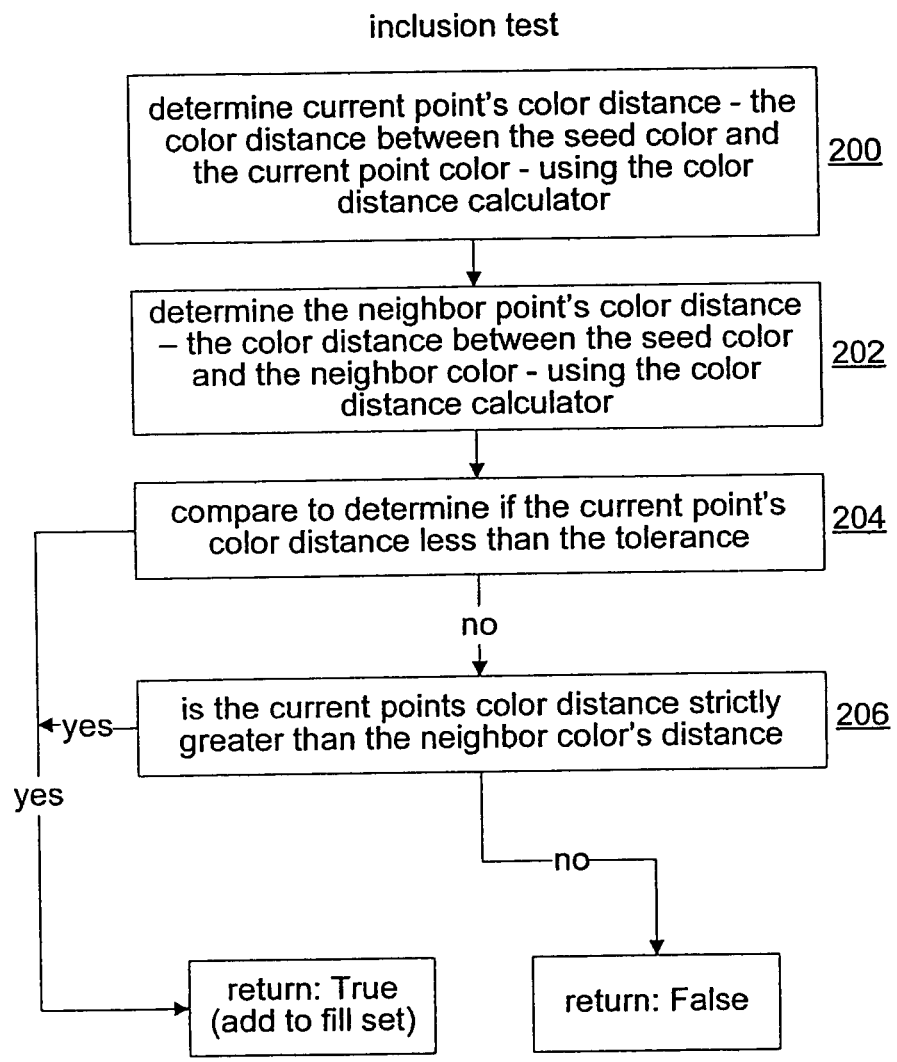
FIG. 9 shows the inclusion test or stopping criteria of the flood fill algorithm shown in FIG. 8.

FIG. 9 shows the inclusion test or stopping criteria of the flood fill algorithm shown in FIG. 8. The test starts with a seed color, a point color that is the color of the point being considered for inclusion (for purposes of this test, the current point and its color are synonymous), a neighbor color that is the color of a point or pixel neighboring the point being tested, and a tolerance. First, the inclusion test determines 200 the current point's color distance—the color distance between the seed color and the current point color—using a color distance calculator, which is discussed below with reference to FIG. 10. Next, the inclusion test determines 202 the neighbor point's color distance—the color distance between the seed color and the neighbor color—using the color distance calculator. The two color distances from steps 200 and 202 are compared to determine 204 if the current point's color distance is less than the tolerance. When it is determined 204 that the current point's color distance is less than the tolerance, true is returned. Conversely, when it is determined 204 that the current point's color distance is not less than the tolerance, then: false is returned when the neighbor's color distance is 206 less than the tolerance; and true is returned when the neighbor's color distance is 206 not less than the tolerance. Referring back to FIG. 8, the inclusion test in FIG. 9 is applied 176 to the current point and the current point is added to the fill set according to the true/false value returned by the inclusion test. The added point is in turn recursively processed.

The flood fill algorithm discussed above, and in particular the stop/inclusion criteria can also be understood by the following explanation. If the image is considered as an array of heights that are color distances from the seed color, then going across a stroke or line the height goes up to a peak around the center of the line and then back down on the other side. It is desirable to flood fill up to the center or peak of the line. But one line or edge can be fainter than another. Using a straight tolerance will not lead to the center of each line; some lines would have halos. By using a stopping or inclusion criteria that looks at neighbors of a point being considered for inclusion, it is possible to include and weight points going "up" the profile of a line and exclude points that are on the downside of a lines color difference profile.

Figure 10:
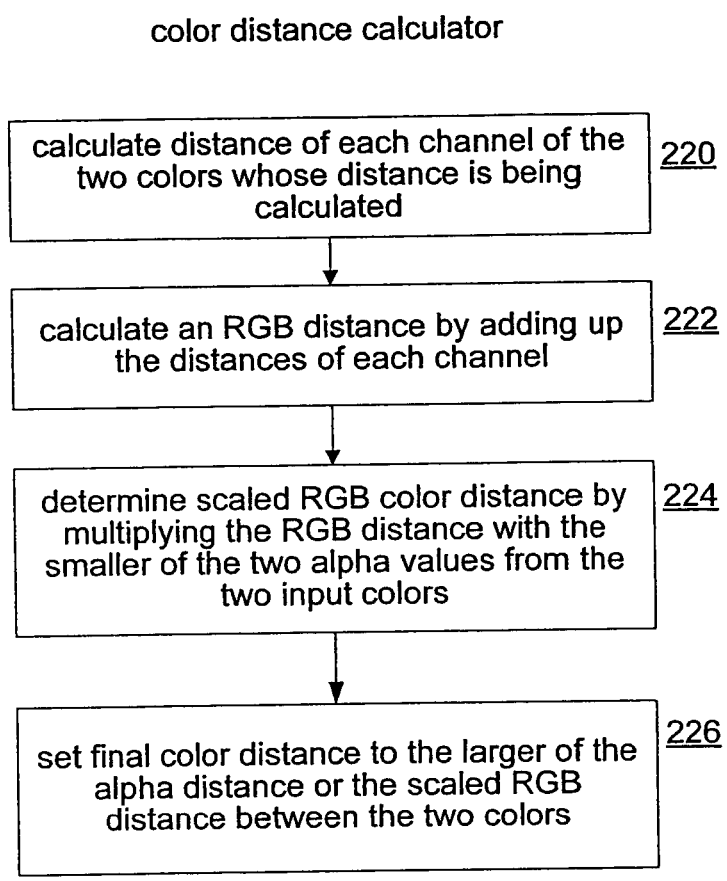
FIG. 10 shows a color distance calculator.

FIG. 10 shows a color distance calculator suitable for use in steps 200 and 202 in FIG. 9. The color distance calculator in FIG. 10 starts with two input colors, in RGBA format, for example, and outputs a number from 0.0 to 1.0, for example. A distance between each channel of the two input colors is calculated 220, preferably using simple differences (i.e. Manhattan distance). An RGB distance is calculated 222 by adding up the calculated 220 distances of each channel. A scaled RGB color distance is determined 224 by multiplying the calculated 222 RGB distance with the smaller of the two alpha values from the two input colors. The final color distance is set 226 to the larger of (1) the difference between the alphas of the respective input colors, and (2) the determined 224 scaled RGB distance.

The color distance calculator of FIG. 10 has been found, through trial and error, to provide optimal results. However, variations and other means of calculating color distance can be used. Although the Manhattan RGB distance is preferable for step 220, Euclidean distance can also be used, and though theoretically more precise than a Manhattan distance, it is usually hard to tell the difference. It is significantly beneficial to take the smaller of the two alpha values from the two input colors and multiply by the RGB distance (non-alpha distance) and then choose either that alpha distance or the distance of the scaled RGB depending on which is bigger. Another important aspect of the color distance calculator is that even if two color values are very close in color distance (RGB distance) but very different in terms of their respective opacities, a strong difference in their respective opacities can be more significant than their RGB distance.

Figure 11:
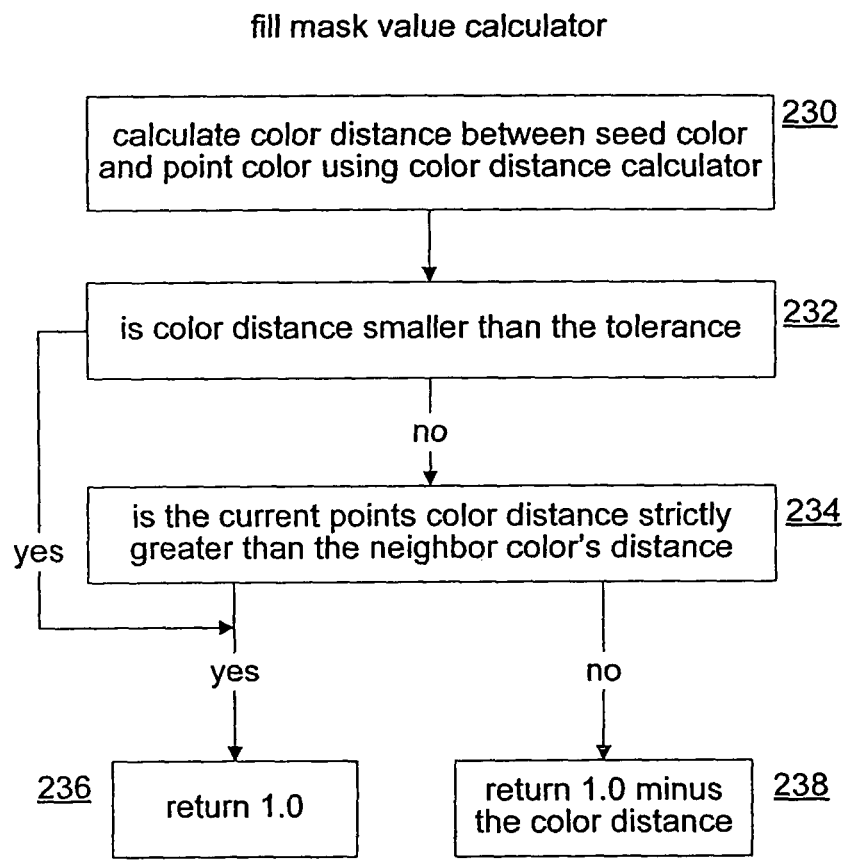
FIG. 11 shows a fill mask value calculator.

FIG. 11 shows a fill mask value calculation. In generating a fill mask for the first flood fill algorithm, fill mask values are determined 180 (see FIG. 8) using a fill mask value calculator. The fill mask value calculator shown in FIG. 11 starts with the seed color, the color of the point whose corresponding fill mask value is currently being calculated, and the tolerance. The color distance between the seed color and the point color is calculated 230 using the color distance calculator. When the calculated 230 color distance is 232 smaller than the tolerance, the calculator returns 236 a value of 1.0. When the calculated 230 color distance is 232 not smaller than the tolerance: the calculator returns 236 a value of 1.0 when the current point's color distance is 234 not strictly greater than the neighbor color's distance, and returns 238 value 1.0 minus the color distance when the current point's color distance is 234 strictly greater than the neighbor color's distance.

Above, when testing if a point is to be included (inclusion test), not only is the algorithm looking at the current pixel, but it is also looking at the neighbor in the direction it is going, which handles edge conditions. The fill value is going to be based on that also. The algorithm takes the seed color, point color, and tolerance, and if the color distance is smaller than the tolerance, the color distance is used, otherwise 1.0 minus the color distance is used.

Although the first flood fill algorithm discussed above works well as a compliment to a second flood fill algorithm (discussed below), the first flood fill algorithm can also stand on its own. For some images, anti-aliased flood fills are crisp and free of artifacts, which has not previously been accomplished. However, sometimes the first algorithm may not produce satisfactory results, such as when the input image has smooth gradations of color as in photographs or airbrush drawings. As discussed below, the undesirable results can be recognized.

Dimple/Pimple Test

Figure 12:
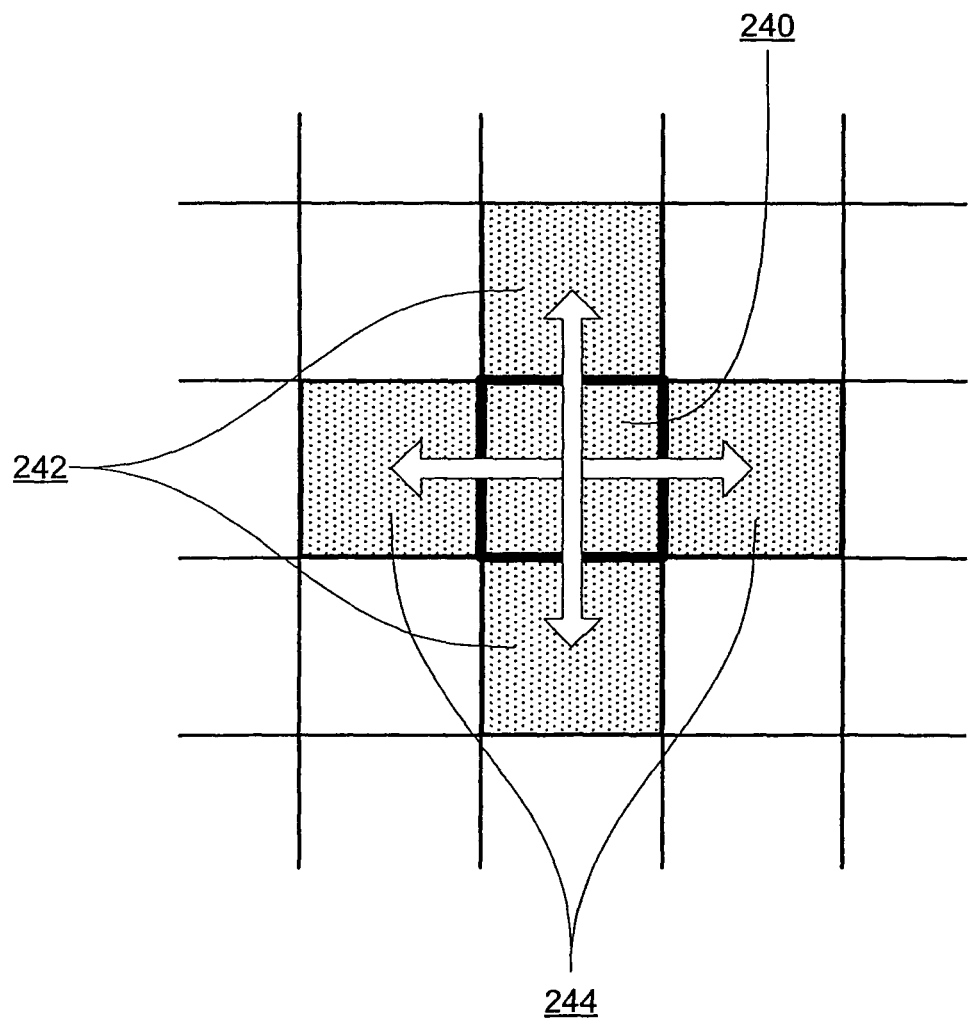
FIG. 12 shows a potential dimple to be tested in a flood fill result of the first flood fill algorithm or any other flood fill algorithm.

Usually a flood filled region has very little noise, therefore high amounts of noise generally indicate an unsatisfactory result. However, noise can occur and can be checked for. Results of the first flood fill algorithm can be checked using a test referred to herein as the dimple test. FIG. 12 shows a potential dimple 240 to be tested in a flood fill result of the first flood fill algorithm or any other flood fill algorithm.

Figure 13:
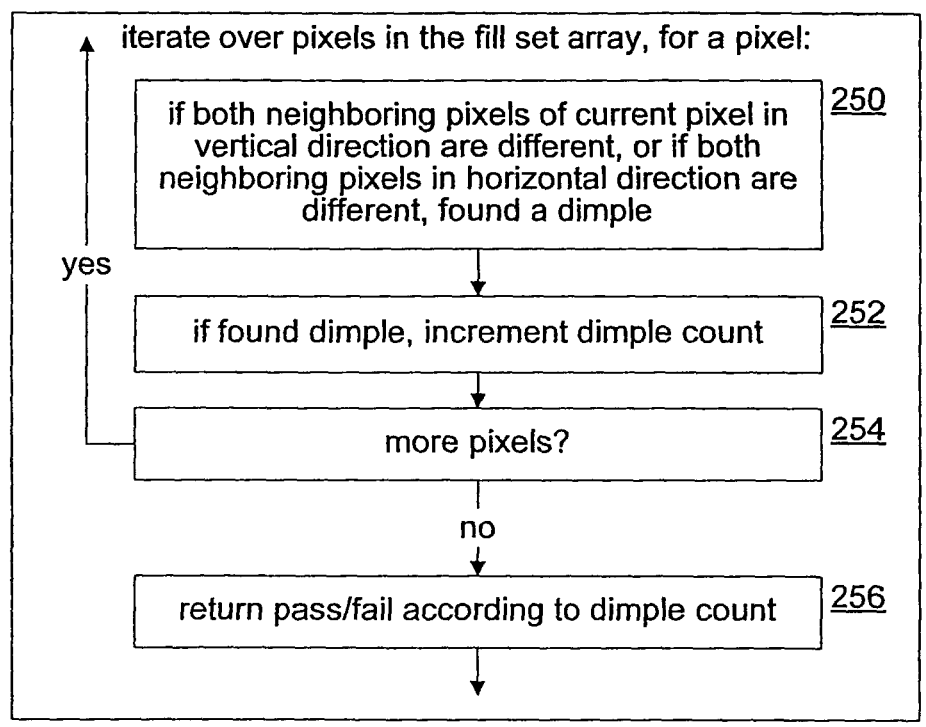
FIG. 13 shows a dimple test applicable to a fill region or fill mask.

Although explained more precisely below, a dimple is roughly a dot or pimple; a point of contrast or singularity. In FIG. 12, test point 240 is compared to its vertical neighbors 242 and its horizontal neighbors 244. FIG. 13 shows a dimple test applicable to a fill region or fill mask. Pixels in the fill mask or the fill region are iterated over, and for a current pixel: if 250 both vertical neighbors 242 of the current pixel 240 are different, or if both horizontal neighbors 244 of the current pixel 240 are different, then a dimple is found and a dimple count is incremented 252. When no more pixels remain 254 in the fill mask/region, the test returns a pass or fail according to the dimple count. The return value can be according to a simple threshold dimple count, a ratio of dimples, a density of dimples, etc. The more dimples found, the more likely it is that there is a failure of the first flood fill algorithm or whatever other algorithm is being tested.

Effectively, the dimple test is checking the border of the fill mask, and can be optimized by testing only on or near the border. However, the test is inexpensive so this optimization is not usually necessary or preferable. The test also stands alone as a test capable of efficiently checking for border noise.

Second Flood Fill Algorithm

Previous techniques flood fill by generating a single channel image, or mask, of the pixels to be filled, and then they apply a convolution filter or a blur to soften the edges. The blurred mask is then used to scale a color or image and then blend that on top. However, artifacts such as halos or a jaggedness effect are common. The jaggedness effect can be reduced with increased blurring, but the edges then appear too soft and greater or larger haloing artifacts appear. There has not been a middle ground where blurring and anti-aliasing combined effectively without producing haloing or jaggedness.

As discussed further above, an image is a discrete sampling, or "discretization" of continuous colors. A pixel can be thought of as a representation or sample of some real value at a particular point; a grid of pixels is not really a precisely subdivided grid, but rather an arrangement of points (centers of a pixel's square) that have space between them. So even a location near a square's border is really a mix of the nearby pixel centers. In sum, pixels are not really squares of color. But, pixels can be treated as such so information can be interpolated.

Figure 14:
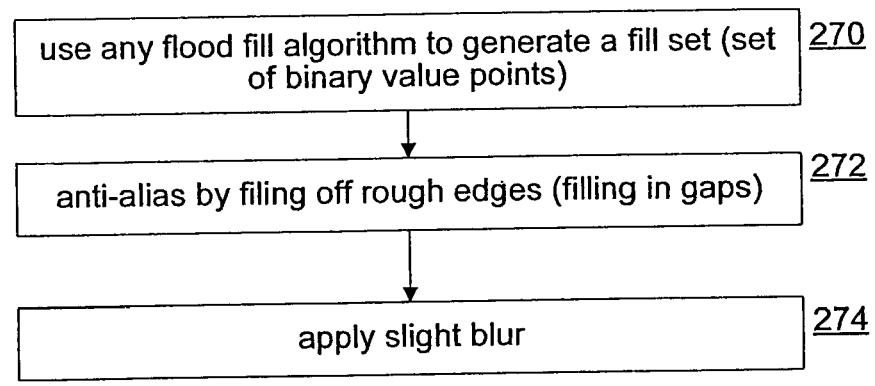
FIG. 14 shows a second anti-aliased flood fill algorithm.

FIG. 14 shows a second anti-aliased flood fill algorithm. Any flood fill algorithm is used to generate 270 a fill set or a fill mask with values of either 0.0 or 1.0. Gaps along the edge of the fill mask are filled 272. This can also be thought of as filing off the rough corners of the fill mask. A slight blur is then applied 274 to the fill mask to create the anti-aliased flood fill region.

Figure 15:
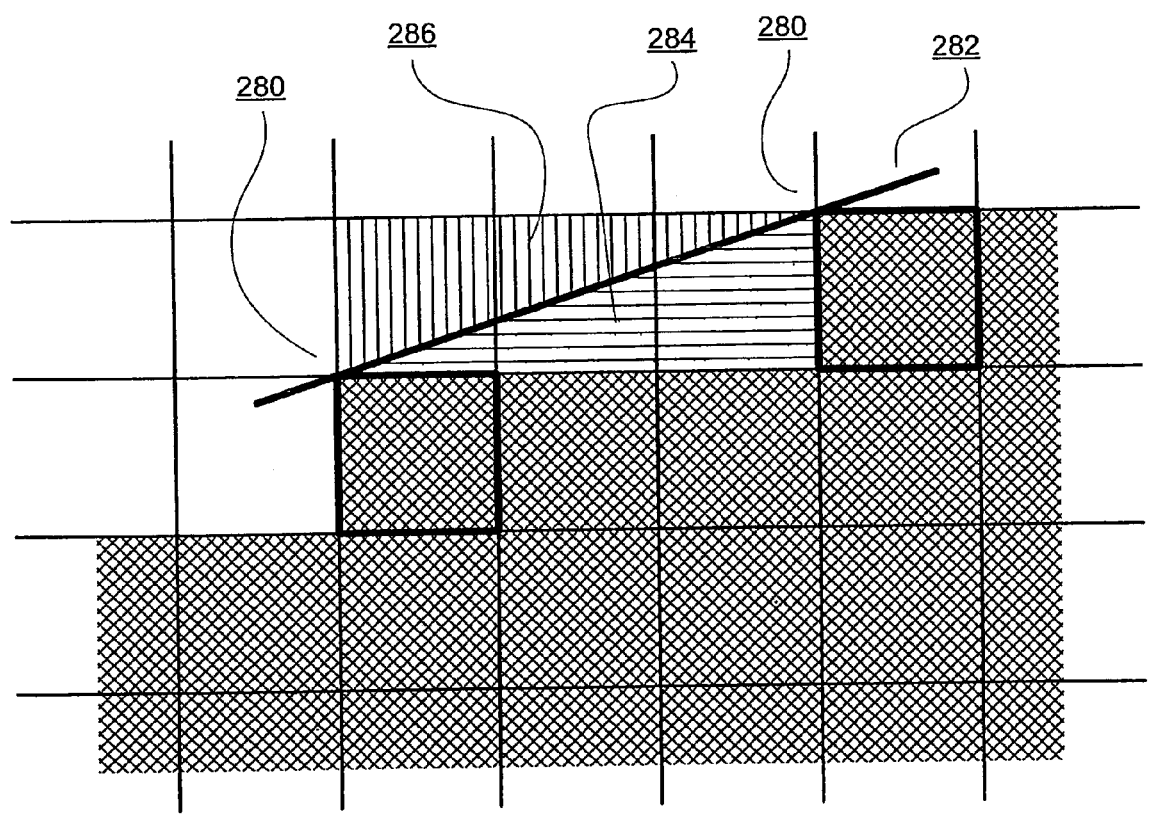
FIG. 15 shows a gap or rough edges.

FIG. 15 shows a gap (points/squares with both horizontal and vertical lines) between rough edges (points 280, seen as bold-lined squares). Checkered points represent points or pixels in the fill mask. Corners of two fill mask pixels 280 are "rough edges". A hypothetical line 282 passes through the corners, creating hypothetical regions 284 near the fill set (horizontal lines) and also vertically striped regions 286 on the other side of the line 282.

Figure 16:
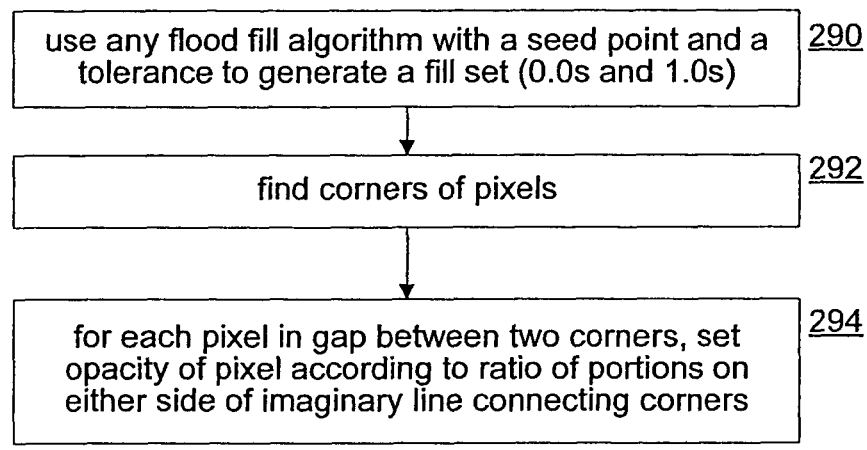
FIG. 16 shows an algorithm for filing off rough edges.

FIG. 16 shows an algorithm for filing off 272 the rough edges 280. First, any flood fill algorithm can be used with a seed point and a tolerance to generate 290 a fill mask (0.0 s and 1.0 s). The fill mask is parsed or walked to find pixels with corners such as pixels 280. Preferably, the pixels have one-pixel width gaps. The points falling on the hypothetical line 282 between the points 280 are filled 272 by setting an opacity of each according to a ratio of areas of the portions on opposing sides of the line 282. In other words, pixels in the gap between the corner pixels 280 will be assigned an opacity or transparency according to how deep or shallow its portion of the gap is; deeper pixels will be assigned higher opacities. Put yet another way with reference to FIG. 15, pixels are assigned opacity according to a ratio of their horizontally-striped region to their vertically-striped region. Although a blur may be applied to the filed-off fill mask, the blur may not be necessary. If a blur is applied after the filing, a 1 to 1.5 pixel radius is preferable. Preferably, the blur is a weighted average blur over a 3×3 pixel neighborhood. That is, for each pixel in the target taking a weighted average, preferably over a 1.5 pixel radius, performs image a Gaussian blur.

Figure 17:
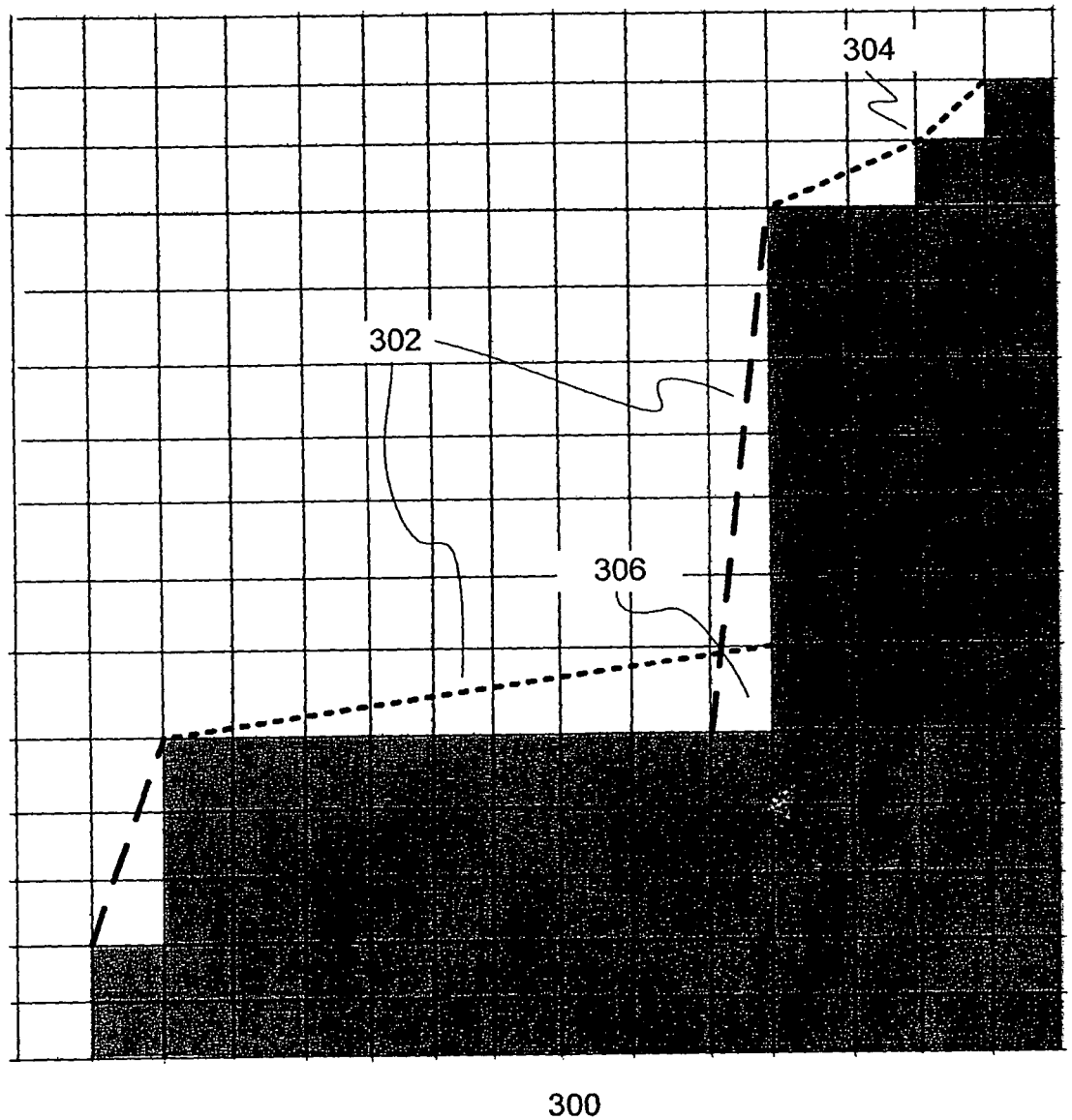
FIG. 17 shows gaps for filling.

FIG. 17 shows gaps for filling with alpha values. Dark squares in grid 300 depict pixels in a fill region. The short dashed lines result from a horizontal pass, and the long dashed lines result from a vertical pass. These lines correspond to line 282 in FIG. 15. The gap filling algorithm scans up and down, left and right, to find runs of pixels. In a preferred embodiment, a run of pixels starts at or near a corner and ends at or near a pixel of the fill region. Preferably, gaps are one pixel wide. A distinguishing characteristic of a gap is that it does not necessarily go from one corner to another, but rather may end against a flat part of the border of the fill region, which may be substantially longer than one pixel or the height of the gap. For example, see the two longest lines 302 in FIG. 17. In other words, a gap can run from a corner to an interior point of a side. A corner can be a corner such as would be found by a convex hull of the fill region, but a corner can also be interior to a convex hull wrapping, as seen by corner 304. That is to say, the algorithm scans for locally outer corners. Furthermore, the gaps may be understood as spanning from a corner to another corner, or from a corner to a side of the fill region. The gaps may also be defined as portions of a theoretical layer around the fill region. Taking a given fill region, there is one pixel wide layer of pixels surrounding the fill region. Pixels in the gap portions of the layer are given alpha values as discussed above.

Some pixels such as pixel 306 are in two gaps, such as the two gaps defined by or corresponding to lines 302. In this case, the alpha value assigned to pixel 306 is preferably the larger of the value according to either line 302. In the example, the alpha value according to horizontal gap/line 302 would be used. An average value may also be used.

Figure 18:
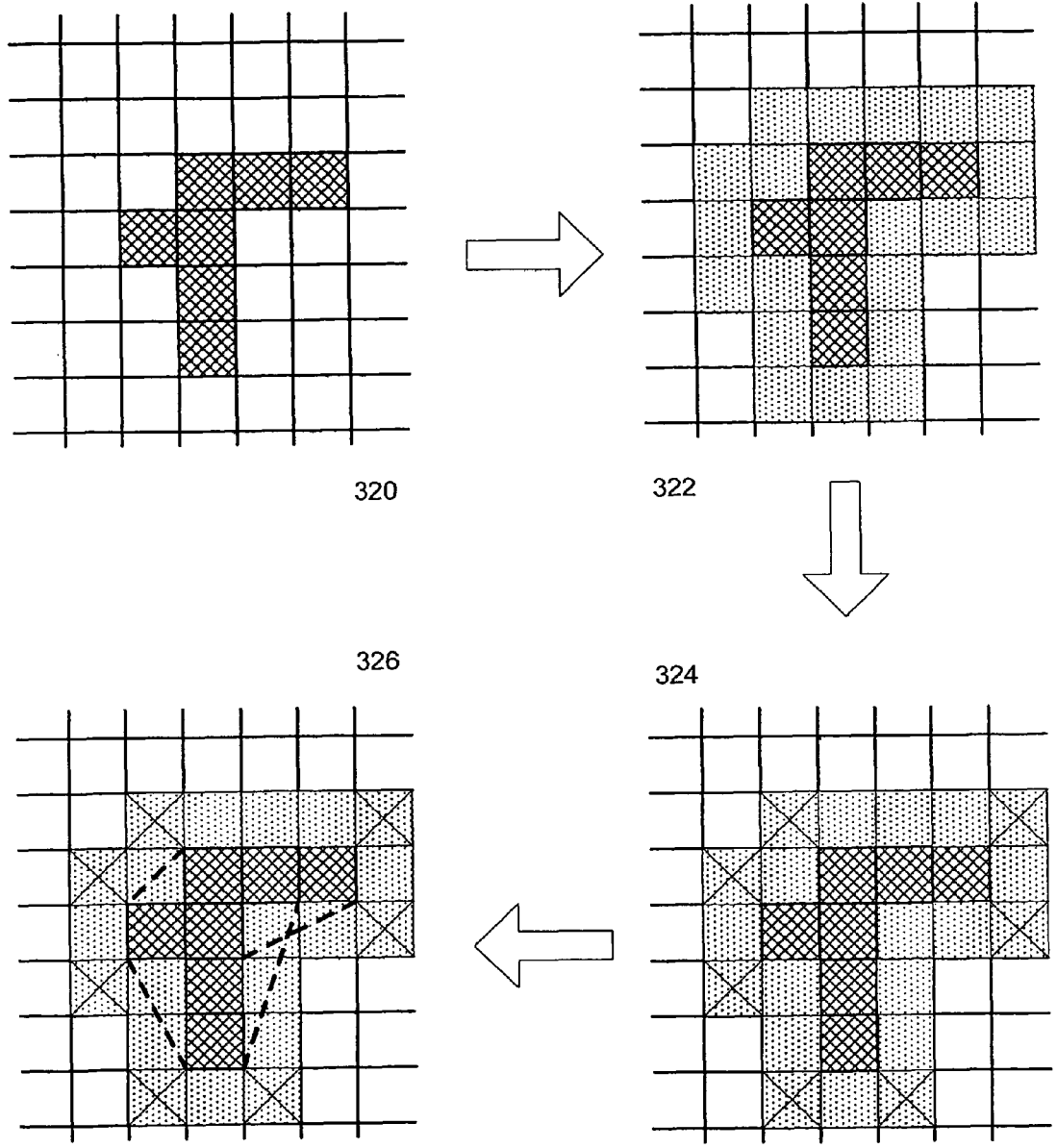
FIG. 18 shows stepwise results of a gap-filling algorithm.

Although vertical and horizontal scans are one approach for gap filling, other approaches are possible. FIG. 18 shows stepwise results of a gap-filling algorithm. Starting 320 with a fill region, a layer of pixels is found 322. Corner pixels of the layer are marked 324. Finally, pixels intersected by dashed lines are filled in proportion to their positions along the gap (i.e. their contribution to the triangles defined by the dashed lines and two sides of the fill region.

The gap-filling algorithm can be applied independently to a defined patch, whether the patch is predefined, derived from a flood fill, or otherwise provided.

CONCLUSION

The tolerances discussed above are not necessary, and can be obviated by setting its value to zero, thus requiring color equivalence. The stopping criteria, the color distance calculator, the fill mask value calculator, and other aspects discussed above each have their own advantages but also work well when combined. The filing off of rough edges can be applied to any boundary whether from a flood fill operation or not. The dimple test can test for noise in any context. Although the description above relates to two-dimensional images, the techniques can be generalized to voxels, n-dimensional arrays, and so on.

The present invention has been described with respect to flood filling a region with anti-aliasing. In forming a fill region, a candidate pixel can be included in the region based on a color of the pixel and also a color of a neighbor of the point. The inclusion basis may be a color distance between a seed color and the points, and a color distance between the seed color and the point's neighbor. Points in the region may be weighted according to their color distance relative to the seed color, where the color distance can also take into account alpha values. Flood filling may be anti-aliased by assigning alpha values to pixels in gaps between corners of the fill region, where an alpha value may be proportional to a point's contribution to the gap. Dimples in a fill region may be tested for and used to determine which of two flood fill algorithms to use.

One of ordinary skill in the art of computer graphics will be able to realize the techniques described above in any number of forms. The techniques are readily achieved on any general or special purpose computing device, preferably a workstation or desktop computer, and in particular in the form of computer software in volatile or non-volatile computer-readable storage such as the working memory (volatile computer-readable storage) or non-volatile storage thereof. The techniques may be embodied on a non-volatile computer-readable storage medium such as Compact Disc, flash ROM, etc., and in particular as part of a computer graphics program thereon.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of performing a flood fill operation on an image given a seed point, the method comprising:
   determining, using a computer having a processor, whether to flood fill a candidate point of the image based on a color of the candidate point, a color of the seed point, and a color of a neighbor point of the candidate point, the determining being based on a color distance between the neighbor point and the seed point, and a color distance between the candidate point and the seed point, wherein the color distance between the candidate point and the seed point is determined by multiplying the smaller of their respective alpha values by a color distance determined based on their respective color channels,
   weighting fill contribution of the candidate point determined to be flood filled according to the color distance between the candidate point and the seed point, and
   for each point in a gap between two corners surrounding pixels of a fill set, setting an opacity value proportional to contribution to the gap by a first area closest to the fill set and a second area opposite the first area as defined by an imaginary line connecting the corners.

2. A volatile or non-volatile non-transitory computer-readable storage storing information enabling a computing device to perform the method according to claim 1.

3. A method of, given a seed point, performing flood fill operations on images using a computer having a processor by applying a flood fill algorithm to fill regions of the images, where the flood fill algorithm comprises:
   determining, using the processor, whether to flood fill a candidate point in a region of one of the images based on a color distance between a neighbor point of the candidate point and the seed point and a color distance between the candidate point and the seed point, wherein the color distance between the candidate point and the seed point is determined by multiplying the smaller of their respective alpha values by a color distance determined based on their respective color channels, and
   weighting fill contribution of the candidate point determined to be flood filled according to the color distance between the candidate point and the seed point,
   where the region is at least in part bounded by pixels of the one of the images that have, in a direction away from the region, substantially increasing color distances from a color of the seed point.

4. A flood filling method comprising:
   providing an image having pixels corresponding to manually sketched lines and one or more regions formed thereby, and
   processing a region of the image using a computer having a processor by:
      determining whether to flood fill a candidate point in the region of the image based on a color distance between a neighbor point of the candidate point and a seed point and a color distance between the candidate point and the seed point, wherein the color distance between the candidate point and the seed point is determined by multiplying the smaller of their respective alpha values by a color distance determined based on their respective color channels, and
      weighting fill contribution of the candidate point determined to be flood filled according to the color distance between the candidate point and the seed point, and
      for each point in a gap between two corners surrounding pixels of a fill set, setting an opacity value proportional to contribution to the gap by a first area closest to the fill set and a second area opposite the first area as defined by an imaginary line connecting the corners.

5. A method according to claim 4, where the manually sketched lines comprise lines drawn with an implement used primarily for drawing lines by hand.

6. A method according to claim 5, where the implement comprises a pencil, or a pen, or a crayon, or a marker, or a paint brush.

7. A flood filling device comprising:
   at least one processor configured to execute operations including:
      providing an image having pixels corresponding to manually sketched lines and one or more regions formed thereby, and
      automatically anti-aliasing and flood filling such a region of the image;
      processing a region of the image by:
         determining whether to flood fill a candidate point in the region of the image based on a color distance between a neighbor point of the candidate point and a seed point and a color distance between the candidate point and the seed point, wherein the color distance between the candidate point and the seed point is determined by multiplying the smaller of their respective alpha values by a color distance determined based on their respective color channels for, and
         weighting fill contribution of the candidate point determined to be flood filled according to the color distance between the candidate point and the seed point, and
      for each point in a gap between two corners surrounding pixels of a fill set, setting an opacity value proportional to contribution to the gap by a first area closest to the fill set and a second area opposite the first area as defined by an imaginary line connecting the corners.

8. A method of performing a flood fill on an image, given a seed point, the method comprising:
   determining, using a computer comprising a processor, whether to flood fill a candidate point in the image based on a color distance between a neighbor point of the candidate point and the seed point and a color distance between the candidate point and the seed point, wherein the color distance between the candidate point and the seed point is determined by multiplying the smaller of their respective alpha values by a color distance determined based on their respective color channels for producing a multiplied alpha distance, and
   weighting fill contribution of the candidate point determined to be flood filled according to the color distance between the candidate point and the seed point.

9. A method according to claim 8, wherein the weighting is done when the candidate point is different in color to the color of the seed point.

10. The method according to claim 8, wherein the color distance between the candidate point and the seed point is further determined by choosing as the color distance either the multiplied alpha distance or a difference between the alpha values of the candidate point and the seed point.

11. The method according to claim 10, wherein the larger of the multiplied alpha distance and the difference between the alpha values is chosen as the color distance.

12. A volatile or non-volatile non-transitory computer-readable storage storing information enabling a computing device to perform the method according to claim 8.

13. A device performing a flood fill on an image, given a seed point, comprising:
   a computer configured to execute operations, including:
      determining whether to flood fill a candidate point in the image based on a color distance between a neighbor point of the candidate point and the seed point and a color distance between the candidate point and the seed point, wherein the color distance between the candidate point and the seed point is determined by multiplying the smaller of their respective alpha values by a color distance determined based on their respective color channels for producing a multiplied alpha distance, and
      weighting fill contribution of the candidate point determined to be flood filled according to the color distance between the candidate point and the seed point.

14. A method of performing a flood fill operation on an image, given a seed point, the method comprising:
   generating a fill set with a first fill algorithm and performing the flood fill operation; and
   checking for dimples in the fill set, and
   where the fill set is generated by calculating color distances between the color of the seed point and points of the image that are candidates to be filled by the flood fill operation using a computer having a processor, when a candidate point is to be flood filled, weighting fill contribution of the candidate point according to a color distance of the candidate point from the color of the seed point, and where the color distances are based fully or partly on an alpha value of the color of the seed point and the alpha values of the candidate points and for each candidate point in a gap between two corners, an opacity of the candidate point is set according to a ratio of a first area closest to the fill set relative to a second area as defined by an imaginary line connecting the corners, and wherein a color distance between a point and the color of the seed point is calculated using the processor by multiplying the smaller of their respective original alpha values by a color distance based on their color channels, and choosing as the calculated color distance either the multiplied alpha distance or an alpha value of either the point or the seed point.

15. A method according to claim 14, further comprising using the processor by deblending the seed color from a point before flood filling the point.

\* \* \* \* \*